United States Patent
Cook

(10) Patent No.: US 6,931,109 B1
(45) Date of Patent: Aug. 16, 2005

(54) LINK SELECTION PARAMETER MODIFICATION FOR NETWORK ACCESS SELECTION

(75) Inventor: Fred S. Cook, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 196 days.

(21) Appl. No.: 10/460,488

(22) Filed: Jun. 12, 2003

(51) Int. Cl.[7] .................. H04M 15/00; H04M 7/00; H04J 1/16; G06F 15/173
(52) U.S. Cl. .................. 379/114.02; 379/221.01; 379/221.07; 370/238; 370/352; 709/239; 709/242
(58) Field of Search .................. 379/114.01, 114.02, 379/114.03, 219, 220.01, 221.01, 221.02, 379/221.05, 221.06, 221.07, 221.09; 370/238; 370/352; 709/238, 242

(56) References Cited

U.S. PATENT DOCUMENTS

| | | | | |
|---|---|---|---|---|
| 6,023,501 A | * | 2/2000 | Wakamatsu | 379/114.02 |
| 6,026,151 A | * | 2/2000 | Bauer et al. | 379/114.24 |
| 6,145,002 A | * | 11/2000 | Srinivasan | 709/225 |
| 6,243,754 B1 | * | 6/2001 | Guerin et al. | 709/227 |
| 6,327,358 B1 | * | 12/2001 | March et al. | 379/221.01 |
| 6,459,783 B1 | * | 10/2002 | March et al. | 379/211.02 |
| 6,778,502 B2 | * | 8/2004 | Ricciulli | 370/238 |

\* cited by examiner

Primary Examiner—Quoc Tran

(57) ABSTRACT

A communication network includes a network selection system and an enterprise system that are connected to a PSTN. The network selection system receives a connection request from the enterprise system through the PSTN network, identifies the enterprise system, retrieves a cost/performance profile of the enterprise system, retrieves ISP cost and performance information for each independent ISP of the plurality of independent ISPs, processes the ISP cost and performance information for each of the plurality of independent ISPs against the cost/performance profile, and selects the one independent ISP from among the plurality of independent ISPs based on the processing of the ISP cost and performance information against the cost/performance profile. Additionally, the network selection system receives updated ISP cost and performance information after the selection, re-processes the ISP cost and performance information against the cost/performance profile, and selects a new independent ISP based on the re-processing.

44 Claims, 4 Drawing Sheets

LINK SELECTION PARAMETER MODIFICATION FOR NETWORK ACCESS SELECTION

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to Internet access.

2. Description of the Prior Art

People seek Internet access for a variety of reasons. The Internet allows persons to send and receive information of many types and in many formats. For example, people use the Internet for sending and receiving e-mail, work, entertainment, communication, collaboration, etc.

A prior art approach to Internet access has been that a user, whether an individual or an employee or agent of an entity, must obtain a network access account from some manner of Internet Service Provider (ISP) in order to access the Internet. The user calls or dials into the ISP using a telephone line and computer modem in order to establish a connection to the network access account. The account may be a periodic account, such as a monthly account. In some cases, the account is an on-demand account, such as through a terminal or kiosk in a public setting.

The prior art approach has several drawbacks. One drawback is that there is generally only one available choice of ISP, unless the user or entity establishes multiple accounts. This is not economically feasible or desirable in most situations. Obtaining multiple accounts would require a user or entity to research ISPs, obtain accounts, and periodically update the ISP research and subscription actions in order to optimize the Internet access. These actions require a significant amount of time, but still would not necessarily ensure a best cost and performance at any time. Consequently, the majority of Internet users subscribe to Internet access on a periodic basis and do not have on-demand access.

Another drawback is that the prior art access is not obtained on the basis of the cost or performance of the ISP (except maybe on a long-term periodic basis). For example, a user may determine that a certain ISP has the best combination of overall price and performance as judged in a monthly or yearly fashion. Moreover, the prior art cannot dynamically select an ISP based on cost and performance feedback received from ISPs.

Another drawback is that the prior art does not provide an automatic ISP selection for users. Even if a user or entity has multiple Internet access accounts, the user must still perform the tasks of researching the ISPs and selecting a current best ISP.

SUMMARY OF THE INVENTION

The invention helps solve the above problems. Advantageously, the invention provides an autonomous network access selection, and further provides a network access selection that selects an independent ISP based on an ISP cost and performance, including a dynamic ISP cost and performance.

A network selection system is provided according to an embodiment of the invention. The network selection system selects one independent Internet service provider (ISP) for an enterprise system from among a plurality of independent ISPs. The network selection system comprises a public switched telephone network (PSTN) interface configured to communicate with a PSTN network. The enterprise system is connected to the PSTN network by a dedicated telephone link. The network selection system further comprises a packet interface configured to communicate with the plurality of independent ISPs. The network selection system further comprises a processing system in communication with the PSTN interface and the packet interface. The processing system is configured to receive a connection request from the enterprise system through the PSTN network, identify the enterprise system, retrieve a cost/performance profile of the enterprise system, retrieve ISP cost and performance information for each independent ISP of the plurality of independent ISPs, process the ISP cost and performance information for each of the plurality of independent ISPs against the cost/performance profile, select the one independent ISP from among the plurality of independent ISPs based on the processing of the ISP cost and performance information against the cost/performance profile, receive updated ISP cost and performance information from at least one independent ISP after the selection, re-process the ISP cost and performance information against the cost/performance profile, and select a new independent ISP based on the re-processing.

A network access selection method for selecting one independent Internet service provider (ISP) for an enterprise system from among a plurality of independent ISPs is provided according to an embodiment of the invention. The method comprises the step of receiving a connection request from the enterprise system through a public switched telephone network (PSTN) network. The enterprise system is connected to the PSTN network by a dedicated telephone link. The method further comprises the steps of identifying the enterprise system, retrieving a cost/performance profile of the enterprise system, and retrieving ISP cost and performance information for each independent ISP of the plurality of independent ISPs. The method further comprises the steps of processing the ISP cost and performance information for each of the plurality of independent ISPs against the cost/performance profile and selecting the one independent ISP from among the plurality of independent ISPs based on the processing of the ISP cost and performance information against the cost/performance profile. The method further comprises the steps of receiving updated ISP cost and performance information from at least one independent ISP after the selecting step, re-processing the ISP cost and performance information against the cost/performance profile, and selecting a new independent ISP based upon the re-processing.

A network access selection software product that selects one independent Internet service provider (ISP) for an enterprise system from among a plurality of independent ISPs is provided according to an embodiment of the invention. The network access selection software product comprises control software configured when executed by a processing system to direct the processing system to receive a connection request from the enterprise system through a public switched telephone network (PSTN) network (with the enterprise system being connected to the PSTN network by a dedicated telephone link), identify the enterprise system, retrieve a cost/performance profile of the enterprise system, retrieve ISP cost and performance information for each independent ISP of the plurality of independent ISPs, process the ISP cost and performance information for each of the plurality of independent ISPs against the cost/performance profile, select the one independent ISP from among the plurality of independent ISPs based on the processing of the ISP cost and performance information against the cost/performance profile. The control software is further configured to receive updated ISP cost and performance information from at least one independent ISP after the selection, re-process the ISP cost and performance information against the cost/performance profile, and select a new independent ISP based upon the re-processing. The network access selection software product further comprises a storage system that stores the control software.

BRIEF DESCRIPTION OF THE DRAWINGS

The same reference number represents the same element on all drawings.

DETAILED DESCRIPTION OF THE PREFERRED EMBODIMENT

FIGS. 1–4 and the following descriptions depict specific embodiments to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will also appreciate that the features described below can be combined in various ways to form multiple variations of the invention. As a result, the invention is not limited to the specific embodiments described below, but only by the claims and their equivalents.

Figure 1:
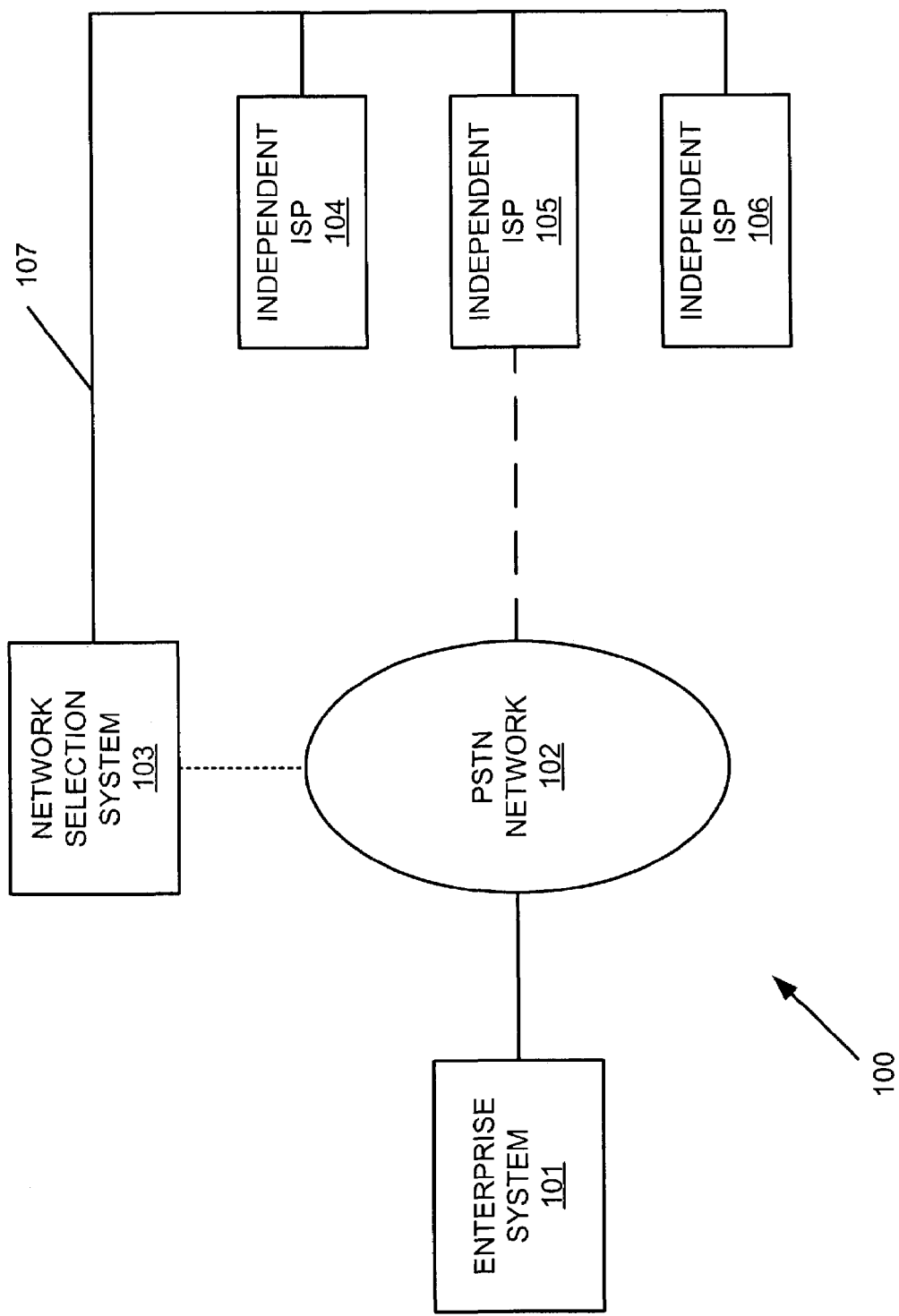
FIG. 1 shows a communication network according to an embodiment of the invention.

FIG. 1 shows a communication network 100 according to an embodiment of the invention. The communication network 100 includes the enterprise system 101, a Public Switched Telephone Network (PSTN) 102, a network selection system 103, and a plurality of independent ISPs 104, 105, 106, etc. The enterprise system 101 is connected to the PSTN network 102 through a dedicated connection (i.e., the enterprise system 101 buys or rents a dedicated telephone line). The PSTN network 102 can form temporary connections to the network selection system 103 and can connect to any of the independent ISPs. In contrast, the network selection system 103 is connected to all of the independent ISPs by a digital computer network 107 such as a local area network (LAN), wide area network (WAN), virtual private network (VPN), or the Internet.

The communication network 100 is capable of selecting an independent Internet Service Provider (ISP) for an enterprise system 101 from among the plurality of ISPs 104, 105, 106, etc. The selection can be performed before a connection is established to an independent ISP or anytime after the selection, including during a session. For example, the connection can be dynamically switched to a different independent ISP during a current session (discussed in detail below).

It should be understood that any number of independent ISPs can be brokered by the communication network 100, but only three are shown in the figure for the sake of clarity. An independent ISP is an access provider that provides Internet access independent of other Internet access providers. An independent ISP can be a commercial Internet access provider, such as America Online™, for example.

The dashed line in the figure between the network selection system 103 and the PSTN network 102 represents a temporary connection that is used to perform the ISP selection. The solid lines represent dedicated or persistent connections. For example, the enterprise system 101 is connected to the PSTN network 102 through a dedicated telephone link such as a telephone wire or cable (the enterprise system 101 can comprise some manner of institution or enterprise, such as a business or corporation, that purchases or leases dedicated telephone lines). The dedicated lines may be used for internal and/or external communications. The dashed line between the PSTN network 102 and the ISP 105 represents a session connection that was established as a result of the network access selection according to the invention. However, it should be understood that the connections between the PSTN network 102 and the ISPs can comprise dedicated lines, with the traffic distribution (and line utilization) changing over time.

Through the network selection system 103, the enterprise system 101 requests a connection to an independent ISP. The connection request may be initiated by dialing a particular telephone number (including 1-800 and 1-900 series telephone numbers, for example), by dialing a telephone number and code, etc. In response to the request, the network selection system 103 identifies the requesting enterprise system 101. The identification can be accomplished through the PSTN network 102 identifying the dedicated line extending from the enterprise system 101. The identification allows the appropriate cost/performance profile to be retrieved for the requesting enterprise system 101. The network selection system 103 then selects an appropriate independent ISP for the enterprise system 101 based on performance and cost criteria for the independent ISPs, as will be discussed below. The network selection system 103 therefore provides a mechanism whereby a communications carrier, such as the PSTN network 102, can influence the ISP selection made by an end-user or by a route selection device. The PSTN network 102 subsequently connects the enterprise system 101 to the independent ISP selected by the network selection system 103. The network selection system 103 therefore brokers access between the enterprise system 101 and a selected independent ISP based on the processing of the ISP cost and performance information for each of the plurality of independent ISPs against the cost/performance profile.

In addition, after the selection, the network selection system 103 can receive updated ISP cost and performance information from at least one independent ISP. The updated ISP cost and performance information can be broadcast by an independent ISP upon any cost or performance change by that ISP, can be periodically or intermittently requested by the network selection system 103, etc. The network selection system 103 re-processes the ISP cost and performance information (including the updated ISP cost and performance information) against the cost/performance profile and selects a new independent ISP based on the re-processing. As a result, the network selection system 103 selects a new independent ISP if the updated ISP cost and performance information minimizes cost and maximizes performance more than the one (selected) independent ISP. It should be noted that the selected lines can comprise virtual circuits (i.e., a connection over a high-capacity link such as a T1 telephone line carrying multiple connections, with each connection being identified by an address or other identifier), or can comprise multiple paths to the same ISP.

The enterprise system 101 can be a corporation, government entity, etc., or other institution desiring a dedicated line or lines for use of employees or members. The enterprise system 101 may include any number of computerized devices that are capable of communicating with an independent ISP. For example, a computerized device within the enterprise system 101 may include a computer and a network interface or a computer and a telephone modem. In addition, the computerized device may include a personal digital assistant (PDA), an Internet Protocol (IP) capable telephone or cellular telephone, a laptop or tablet computer device, etc. The enterprise system 101 in one embodiment subscribes to the network selection system 103 and to the network access selection capability.

The PSTN network 102 can comprise any manner of communication network. The PSTN network 102 can include any manner of telephone wire, cable, optical fiber, etc. The PSTN network 102 can comprise all or part of a PSTN communication network. In addition, the PSTN network 102 can include any manner of satellite or cellular telephone communication system.

An independent ISP 104–106 may be any manner of interface/regulator of a data network or may be some manner of data network. For example, an independent ISP provides access to the Internet, but in addition may provide access to other networks.

The network selection system 103 communicates with the PSTN network 102. The network selection system 103 can be carrier-based (i.e., it can be a component of the PSTN network 102), or can be premise-based (i.e., it can be a component of the enterprise system 101). The network selection system 103 in one embodiment comprises a Service Control Point (SCP) that performs routing functions for the PSTN network 102. When the enterprise system 101 requests an Internet connection, the PSTN network 102 passes the request to the network selection system 103, along with a client and/or user identity (and any other relevant selection information, such as an end-application to be executed on the selected ISP, a user or ISP priority, etc.). The network selection system 103 identifies the enterprise system 101, retrieves a cost/performance profile of the enterprise system 101 (optionally including user and/or end-application information), retrieves ISP cost and performance information for each independent ISP, processes the ISP cost and performance information against the cost/performance profile, and selects one independent ISP from among the plurality of independent ISPs based on the processing of the ISP cost and performance information against the cost/performance profile. In addition, as previously discussed, the network selection system 103 can also re-evaluate the selection of the one independent ISP based on updated ISP cost and performance information, and can select a new independent ISP based on the processing of the updated ISP cost and performance information against the cost/performance profile. It should be understood that the currently connected independent ISP can be re-selected, if the currently connected independent ISP represents the optimal connection cost and performance. The selected independent ISP is connected to the enterprise system 101 by the PSTN network 102, using an available telephone link.

Figure 2:
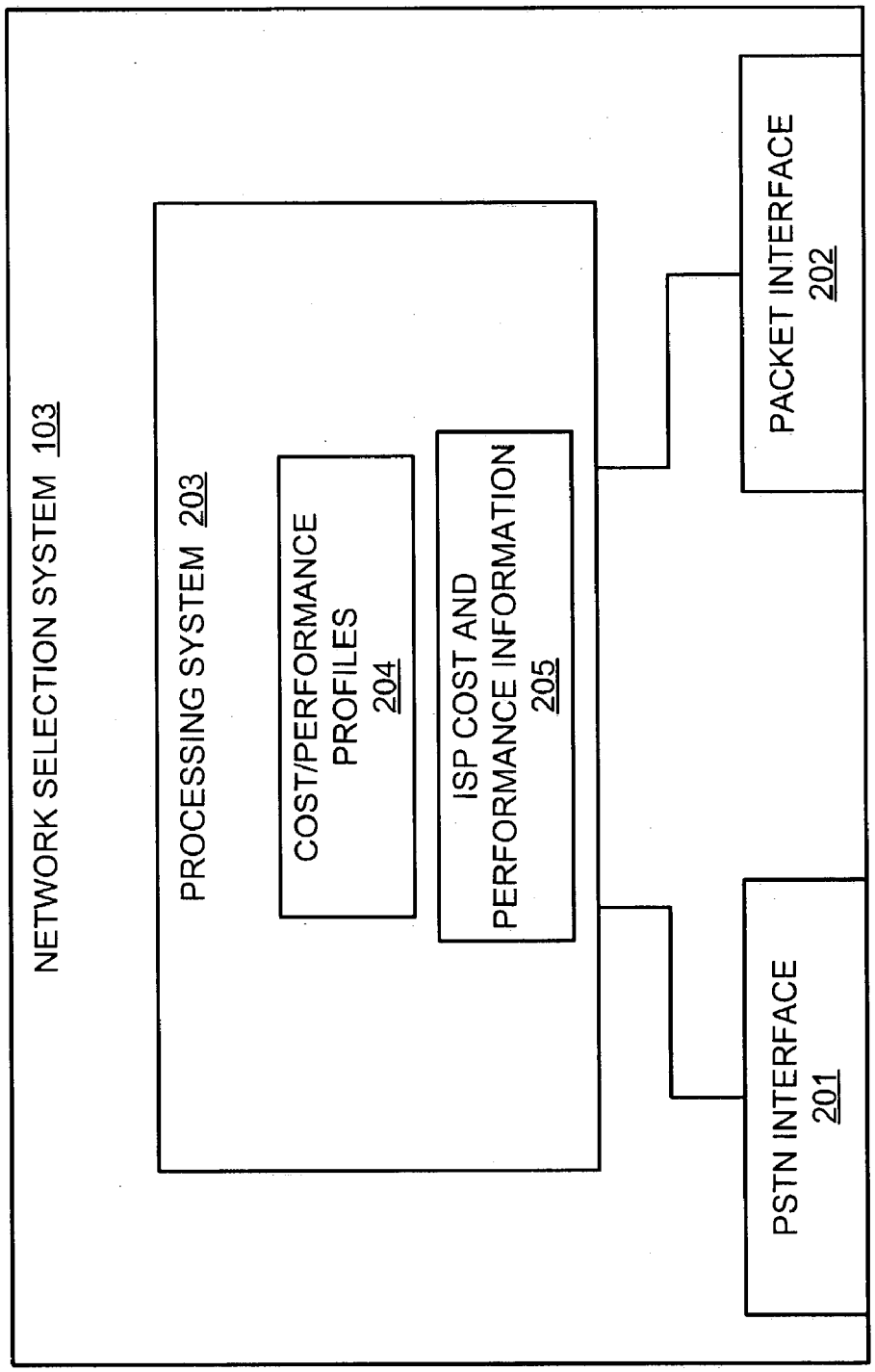
FIG. 2 shows a network selection system according to an embodiment of the invention

The cost/performance profile can be a data structure that stores desired or required cost and performance criteria to be used in selecting the independent ISP (see FIG. 2). For example, a cost/performance profile can comprise a table, graph, formula, database, etc., that stores cost and performance data for each independent ISP. The criteria are compared against corresponding cost and performance information obtained from the ISPs in order to determine acceptable ISPs.

In one embodiment, a cost/performance profile includes an access cost criterion, a quality of service (QoS) criterion, and a rate of bandwidth criterion. In some circumstances, all three criteria are included, although less than three criteria can be used in the selection. For example, a cost/performance profile can exclude a QoS criterion, if desired.

In addition to the above criteria, a cost/performance profile can also include a user subscription level. The user subscription level can be used to further regulate a QoS and a rate of bandwidth selected for the enterprise system 101. Moreover, a cost/performance profile can further include, for example, a volume discount agreement with any of the independent ISPs, a volume limitation agreement with any of the independent ISPs, can include a stored typical connection duration that may be used to decide an independent ISP, can include cumulative period data for the enterprise system 101, etc. For example, a typical connection duration may be used in order to determine whether a volume discount on a particular independent ISP is likely to be received. Consequently, the network selection system 103 can select a particular independent ISP in order to achieve a volume discount.

It should be understood that each enterprise system 101 may have one or more such cost/performance profiles stored in the network selection system 103, and the enterprise system 101 therefore may employ a specific cost/performance profile of multiple available profiles. For example, if the enterprise system 101 is a corporation, a cost/performance profile can be selected based on a time of day, day of week, user classification, communication type, task type, etc.

The ISP cost and performance information can comprise any combination of ISP characteristics (see FIG. 2). The ISP cost and performance information 205 may include, among other things, quality of service (QoS) information, an access cost information, a rate of bandwidth information, and a service availability information. Other ISP information may be included if desired. The ISP cost and performance information 205 therefore gives the network selection system 103 information on how each independent ISP is performing and the cost of each available level of performance.

In one embodiment, the ISP cost and performance information 205 is information broadcast by the independent ISPs. In another embodiment, the ISP cost and performance information 205 is information requested by the network selection system 103. The broadcasts and/or requests can be periodic or can be issued on an as-needed basis. The ISP cost and performance information 205 therefore can comprise instantaneous or sampled ISP information. Alternatively, the updated ISP cost and performance information can comprise dynamic information that changes during a session. In addition, the updated ISP cost and performance information can be pushed to the network selection system 103 by the independent ISPs.

Billing for the network access selection can be configured in multiple ways. In one embodiment, each independent ISP collects session statistics and passes such billing information to the network selection system 103. In this embodiment, the network selection system 103 collects the billing information and bills the users for all connection activity. In another billing embodiment, each connection is billed on a per-minute basis through the PSTN network 102. In this embodiment, the PSTN network 102 can offer the network access via a 1-900 toll call, for example, and the proceeds could be divided with the appropriate independent ISPs based on the session durations.

FIG. 2 shows a network selection system 103 according to an embodiment of the invention. The network selection system 103 includes a PSTN interface 201 for interfacing with the PSTN network 102, a packet interface 202 for interfacing with the independent ISPs, and a processing system 203 that is connected to both the PSTN interface 201 and the packet interface 202.

The PSTN interface 201 comprises any device capable of communicating with the PSTN network 102. In one embodiment, the PSTN interface 201 comprises a telephone interface circuit. In another embodiment, the PSTN interface 201 comprises a modem.

The packet interface 202 comprises any device capable of communicating with an independent ISP (or a packet network that links to an independent ISP). For example, the packet interface 202 is capable of communicating using the Internet Protocol (IP).

The processing system 203 conducts operations of the network selection system 103. The processing system 203 could comprise a general purpose computer, a microprocessing system, a logic circuit, or some other general purpose or customized processing device. The processing system 203 may be distributed among multiple processing devices. The processing system 203 can include any manner of integral or independent electronic storage medium.

The processing system 203 communicates with the PSTN network 102 via the PSTN interface 201 and communicates with the independent ISPs via the packet interface 202. The processing system 203 includes one or more cost/performance profiles 204 corresponding to enterprise systems 101 (and optionally corresponding to users and/or end applications). Additionally, the processing system 203 includes ISP cost and performance information 205. The cost/performance profiles 204 and the ISP cost and performance information 205 can be stored in some manner of digital storage medium (not shown). The processing system 203 is configured to receive a connection request from the enterprise system 101 through the PSTN network 102 and the PSTN interface 201, identify the enterprise system 101, retrieve a cost/performance profile of the enterprise system 101, retrieve ISP cost and performance information for each independent ISP of the plurality of independent ISPs 104–106, and process the ISP cost and performance information 205 for each of the plurality of independent ISPs against the cost/performance profile 204. The processing system 203 then selects one independent ISP from among the plurality of independent ISPs 104–106 based on the processing of the ISP cost and performance information 205 against the cost/performance profile 204. The processing system 203 is further configured to receive updated ISP cost and performance information 205 after the selection, re-processes the ISP cost and performance information 205 against the cost/performance profile 204, and select a new independent ISP based on the re-processing.

The cost/performance profiles 204 comprise cost and performance criteria or ranges desired by the corresponding enterprise system 101, as previously discussed.

The ISP cost and performance information 205 stores information received from the independent ISP providers, as previously discussed.

Figure 3:
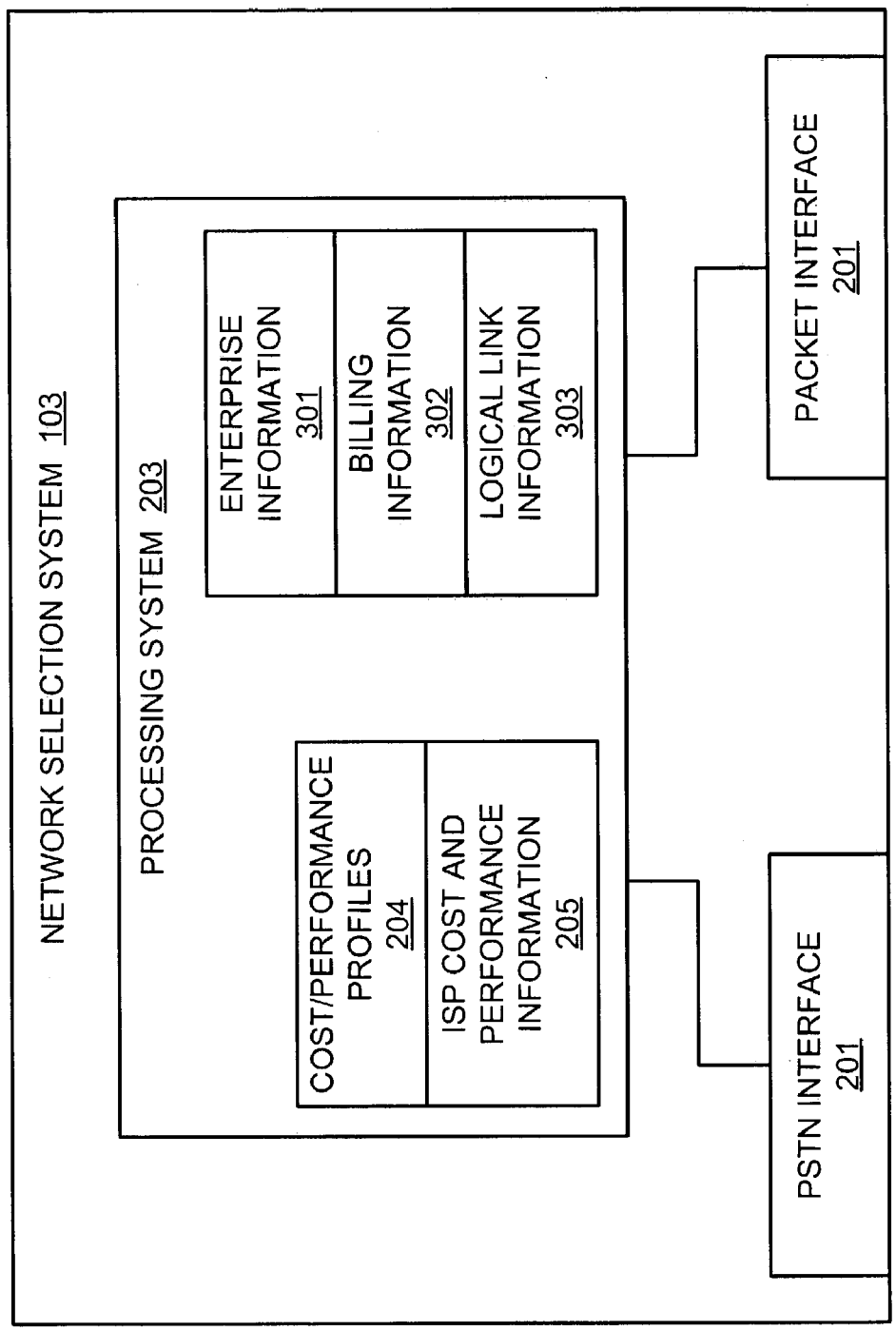
FIG. 3 shows the network selection system according to another embodiment of the invention.

FIG. 3 shows the network selection system 103 according to another embodiment of the invention. In addition to the previously recited components, in this embodiment the processing system 203 includes an enterprise information 301, a billing information 302, and a logical link information 303.

The enterprise information 301 can comprise, among other things, a user ID, an activity code, and a cost/performance profile code. The enterprise information 301 is used in the selection process and refines the selection. The user ID can be included in order to identify a particular user within the enterprise system 101. Each user within the enterprise system 101 can be assigned a unique user ID. As a result, a billing information can be broken down by users. Furthermore, the ISP selection can be refined based on the user.

An activity code may present connection options to the user, including activity codes for different connection activities. By matching a user-entered code to the activity codes in the network selection system 103, the network selection system 103 can accept and act on user inputs. For example, a user could press a "*8" code on a telephone keypad and receive an ISP selection that is optimized for video conferencing (if the user is determinable through Automatic Number Identification (ANI) and if the video quality is given in the cost/performance profile). This may be advantageous in that a video conferencing link requires a higher quality of service and rate of bandwidth than many other types of Internet connections. Alternatively, the user may enter a code that specifies a lower quality of service and lower associated cost for a session that does not require a high quality of service or a high bandwidth. For example, a voice-over-IP telephony session requires lower performance than video conferencing or Internet browsing, for example, and therefore costs less. The activity code therefore may specify a particular performance level and a particular cost.

The cost/performance profile code may be an alternative to the activity code. The cost/performance profile code can be entered by the user or can be automatically supplied to the network selection system 103 by the computer device requesting the network access. The cost/performance profile code can select a particular cost/performance profile from among a plurality of cost/performance profiles of the enterprise system 101. For example, the enterprise system 101 may generate and store several cost/performance profiles, and an incoming call from the enterprise system 101 may select an appropriate cost/performance profile code, depending on various factors. For example, the user may select a cost/performance profile code based on the time of day, a job function, a client, a job account number, etc. Therefore, the cost/performance profile code may be used to further optimize the connection, based on the particular circumstances.

The enterprise information 301 may additionally include an ISP history (such as whether a particular ISP has slow periods or excessive down time) and a user and/or enterprise history. The user history can include, for example, a user ISP preference. The enterprise history can include an enterprise-wide connection history (i.e., an enterprise ISP preference).

The billing information 302 can comprise accrued billing information for each enterprise system 101 using the network selection system 103. In one embodiment, the billing information 302 is received from the independent ISPs, and is related to ISP connect sessions. In another embodiment, the billing information 302 can be generated by the network selection system 103 or by the PSTN network 102. In this embodiment, the billing can be related to the number of users per enterprise system, the number of connection operations performed, a per-minute charge generated by the PSTN network 102, or any other factor.

The logical link information 303 includes information on available logical channels on the independent ISPs. If a PSTN network telephone link to an independent ISP is a high-capacity link, such as a T1 telephone line, the telephone link can be logically divided into multiple logical channels in order to subdivide bandwidth for multiple users. For example, an undivided T1 line typically offers 1.544 million bits per second (Mbps) of bandwidth. However, a single user often does not need such a high bandwidth. Therefore, T1 lines are often logically divided into 24 channels of 64 thousand bits per second (Kbps) bandwidth, wherein the 24 channels are multiplexed onto the T1 line in some known manner.

Figure 4:
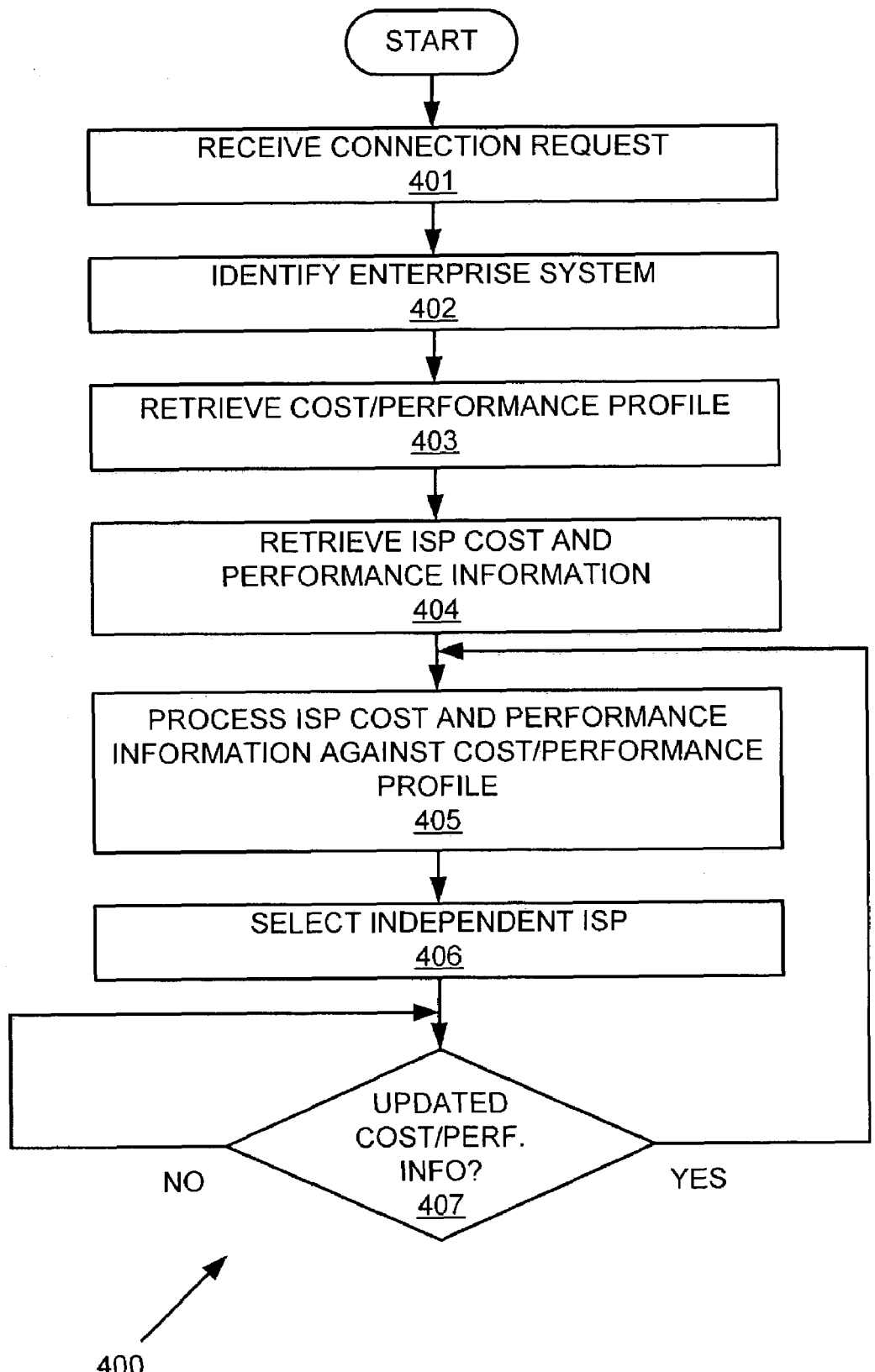
FIG. 4 is a flow chart of a network access selection method according to an embodiment of the invention.

FIG. 4 is a flow chart 400 of a network access selection method according to an embodiment of the invention. In step 401, a connection request is received from an enterprise system 101 (or a user within the enterprise system 101), as previously discussed. The connection request is received through the PSTN network 102 and over a dedicated telephone link from the enterprise system 101.

In step 402, the enterprise system 101 is identified, as previously discussed. Additionally, in this step an authorization process can be performed. As part of the authorization, an enterprise system identification is compared to stored authorization information in order to determine whether a network access selection will be performed for the requesting enterprise system 101. The authorization process may include consulting some manner of authentication server, such as an AAA server (an access, authentication, and accounting server typically used to log users onto an Internet account). The AAA server is capable of accepting or denying an access request of a user. The authorization process may ensure that the enterprise system 101 is known, that the enterprise system 101 is in good standing, and that a billing information can be recorded for the enterprise system 101.

In step 403, an appropriate cost/performance profile is retrieved for the enterprise system 101, as previously discussed. This may include selecting a single cost/performance profile available for the enterprise system or selecting from multiple cost/performance profiles.

In step 404, ISP cost and performance information is retrieved for all of the available independent ISPs, as previously discussed. The ISP cost and performance information specifies both the current performance of each independent ISP and the current access cost for each independent ISP.

In step 405, the ISP cost and performance information is processed against the selected cost/performance profile in order to make the selection. For example, the ISP cost and performance information for each independent ISP is compared against the cost/performance profile to select an independent ISP that best fits the desired cost and ISP performance. In addition, an enterprise information can also be used in making the selection, as previously discussed.

In one embodiment, if no ISP currently fits the cost/performance profile, the network selection system 103 can pick a closest match. In another embodiment, the network selection system 103 does not select an independent ISP and instead notifies the enterprise system 101 of the selection failure. In this second embodiment, the enterprise system 101 can select an independent ISP by issuing an override command or by modifying the cost/performance profile (including a temporary, one-time modification that affects only the current selection process).

In step 406, an appropriate independent ISP is selected that best fits the cost/performance profile. In this manner, the enterprise system 101 is connected to an independent ISP that can provide the best performance with the best cost (i.e., the independent ISP is selected based on the processing of the ISP cost and performance information for each of the plurality of independent ISPs against the cost/performance profile). As a result of the selection, the ISP selection information may be passed to the PSTN network 102 and the PSTN network 102 can complete the connection from the enterprise system 101 to the selected independent ISP.

In step 407, if no updated ISP cost and performance information has been received, the method loops and waits (other processing may be occurring during the looping action). Optionally, the method can be configured to notify the user if the ISP cost and performance information has not been received. The user can choose whether to wait or can generate an input that selects a best available ISP based on any available ISP cost/performance information, including previously received/historical ISP cost and performance information. However, if updated ISP cost and performance information has been received, the method branches back to step 405. In step 405, the updated ISP cost and performance information is re-processed against the cost/performance profile and the selection is re-performed based on the re-processing. It should be understood that all updated ISP cost and performance information for an independent ISP replaces the previous information for that ISP.

The network access selection according to the invention differs from the prior art in that the prior art telephone system does not perform automatic routing and connection to an ISP and does not select from among multiple ISPs. In addition, the prior art does not provide a network selection system able to select and connect a user to an ISP based on the ISPs cost and the ISPs performance. Moreover, unlike the prior art, the invention allows a third party to broker the network access and therefore provide multiple network access options. Furthermore, unlike the prior art, the invention enables on-demand Internet access and enables a centralized billing for the network access brokering.

The network access selection according to the invention provides several benefits. The network access selection selects a best ISP for an enterprise system. The selection is based on the substantially instantaneous ISP cost and performance of all available ISPs. The selection therefore provides on-demand Internet access to an enterprise system, and on an as-needed basis. The network access selection according to the invention can provide network access wherein users pay for actual access time instead of having to pay periodic access fees, regardless of actual usage levels. Furthermore, the selection can accommodate volume discounts, volume limits, or any connection restrictions, and can accommodate both ISP characteristics and user characteristics.

The invention offers additional benefits in that a communication carrier participates in and enables the selection of an ISP that is most economical and is best suited for the end-user. The communications carrier can influence the ISP selection, and can provide a transparent selection process for the user.

What is claimed is:

1. A network selection system configured to select one independent Internet Service Provider (ISP) for an enterprise system from among a plurality of independent ISPs, the network selection system comprising:
   a public switched telephone network (PSTN) interface configured to communicate with a PSTN network, with the enterprise system being connected to the PSTN network by a dedicated telephone link;
   a packet interface configured to communicate with the plurality of independent ISPs; and
   a processing system in communication with the PSTN interface and the packet interface and configured to receive a connection request from the enterprise system through the PSTN network, identify the enterprise system, retrieve a cost/performance profile of the enterprise system, retrieve ISP cost and performance information for each independent ISP of the plurality of independent ISPs, process the ISP cost and performance information for each of the plurality of independent ISPs against the cost/performance profile, select the one independent ISP from among the plurality of independent ISPs based on the processing of the ISP cost and performance information against the cost/performance profile, receive updated ISP cost and performance information from at least one independent ISP after the selection, re-process the ISP cost and performance information against the cost/performance profile, and select a new independent ISP based on the re-processing.

2. The system of claim 1, wherein the PSTN network influences the selection by the network selection system through the ISP cost and performance information.

3. The system of claim 1, wherein the ISP cost and performance information comprises a quality of service (QoS) information and the cost/performance profile comprises a QoS criterion.

4. The system of claim 1, wherein the ISP cost and performance information comprises an access cost information and the cost/performance profile comprises an access cost criterion.

5. The system of claim 1, wherein the ISP cost and performance information comprises a rate of bandwidth information and the cost/performance profile comprises a rate of bandwidth criterion.

6. The system of claim 1, wherein the ISP cost and performance information comprises a service availability information and the cost/performance profile comprises a service availability criterion.

7. The system of claim 1, with the ISP cost and performance information comprising a current and predictive ISP cost information and a current and predictive ISP performance information.

8. The system of claim 1, with the processing system being further configured to receive the updated ISP cost and performance information pushed from the at least one independent ISP to the network selection system.

9. The system of claim 1, wherein the cost/performance profile comprises a volume discount information.

10. The system of claim 1, wherein the cost/performance profile comprises a volume limit information.

11. The system of claim 1, wherein the cost/performance profile comprises a user history information.

12. The system of claim 1, wherein the cost/performance profile comprises a user subscription level.

13. The system of claim 1, wherein the cost/performance profile comprises an ISP history information.

14. The system of claim 1, wherein the cost/performance profile comprises a connection duration history information.

15. The system of claim 1, wherein the cost/performance profile comprises one or more of a volume discount information, a volume limit information, a user history information, a user subscription level, an ISP history information, and a connection duration history information.

16. The system of claim 1, wherein the processing system is further configured to retrieve the cost/performance profile from among a plurality of cost/performance profiles available for the enterprise system.

17. The system of claim 1, further comprising an enterprise information that is used in the processing step to select the one independent ISP, with the stored enterprise information comprising one or more of a user ID, an activity code, and a cost/performance profile code that selects one cost/performance profile from among a plurality of cost/performance profiles of the enterprise system.

18. The system of claim 1, wherein the processing system is further configured to perform an authorization process for the enterprise system before retrieving the cost/performance profile.

19. The system of claim 1, wherein the network selection system comprises a service control point (SCP).

20. The system of claim 1, wherein the processing system is further configured to bill the enterprise system for a resulting connection.

21. The system of claim 1, wherein the processing system is further configured to select the one independent ISP and to select a logical link on the one independent ISP.

22. A network access selection method for selecting one independent Internet service provider (ISP) for an enterprise system from among a plurality of independent ISPs, with the method comprising the steps of:
   receiving a connection request from the enterprise system through a public switched telephone network (PSTN) network, with the enterprise system being connected to the PSTN network by a dedicated telephone link;
   identifying the enterprise system;
   retrieving a cost/performance profile of the enterprise system;
   retrieving ISP cost and performance information for each independent ISP of the plurality of independent ISPs;
   processing the ISP cost and performance information for each of the plurality of independent ISPs against the cost/performance profile;
   selecting the one independent ISP from among the plurality of independent ISPs based on the processing of the ISP cost and performance information against the cost/performance profile;
   receiving updated ISP cost and performance information from at least one independent ISP after the selecting step;
   re-processing the ISP cost and performance information against the cost/performance profile; and
   selecting a new independent ISP based on the re-processing.

23. The method of claim 22, wherein retrieving the ISP cost and performance information influences the selecting.

24. The method of claim 22, with the ISP cost and performance information comprising a current and predictive ISP cost information and a current and predictive ISP performance information.

25. The method of claim 22, with the step of retrieving the updated ISP cost and performance information comprising the at least one independent ISP pushing the updated ISP cost and performance information to the network selection system.

26. The method of claim 22, wherein the ISP cost and performance information comprises a quality of service (QoS) information and the cost/performance profile comprises a QoS criterion.

27. The method of claim 22, wherein the ISP cost and performance information comprises an access cost information and the cost/performance profile comprises an access cost criterion.

28. The method of claim 22, wherein the ISP cost and performance information comprises a rate of bandwidth information and the cost/performance profile comprises a rate of bandwidth criterion.

29. The method of claim 22, wherein the ISP cost and performance information comprises a service availability information and the cost/performance profile comprises a service availability criterion.

30. The method of claim 22, with the step of retrieving the cost/performance profile comprising retrieving a volume discount information.

31. The method of claim 22, with the step of retrieving the cost/performance profile comprising retrieving a volume limit information.

32. The method of claim 22, with the step of retrieving the cost/performance profile comprising retrieving a user history information.

33. The method of claim 22, with the step of retrieving the cost/performance profile comprising retrieving a user subscription level.

34. The method of claim 22, with the step of retrieving the cost/performance profile comprising retrieving an ISP history information.

35. The method of claim 22, with the step of retrieving the cost/performance profile comprising retrieving a connection duration history information.

36. The method of claim 22, with the step of retrieving the cost/performance profile further comprising retrieving the cost/performance profile from among a plurality of cost/performance profiles available for the enterprise system.

37. The method of claim 22, further comprising the step of retrieving an enterprise information, with the processing step processing each ISP cost and performance information against the cost/performance profile and against the stored enterprise information, with the stored enterprise information comprising one or more of a user ID, an activity code, and a cost/performance profile code that selects one cost/performance profile from among a plurality of cost/performance profiles of the enterprise system.

38. The method of claim 22, further comprising the step of performing an authorization process for the enterprise system before retrieving the cost/performance profile.

39. The method of claim 22, with the selecting the one independent ISP further comprising selecting a logical link on the one independent ISP.

40. The method of claim 22, further comprising the step of connecting the enterprise system to the one independent ISP through the PSTN network after selecting the one independent ISP.

41. The method of claim 22, further comprising the step of the one independent ISP recording a billing information for the access.

42. The method of claim 22, further comprising the step of the network selection system recording a billing information for the access.

43. The method of claim 22, wherein the step of identifying the enterprise system comprises identifying the dedicated telephone link used to make the connection request.

44. A network access selection software product that selects one independent Internet service provider (ISP) for an enterprise system from among a plurality of independent ISPs, the network access selection software product comprising:
control software configured when executed by a processing system to direct the processing system to receive a connection request from the enterprise system through a public switched telephone network (PSTN) network, with the enterprise system being connected to the PSTN network by a dedicated telephone link, identify the enterprise system, retrieve a cost/performance profile of the enterprise system, retrieve ISP cost and performance information for each independent ISP of the plurality of independent ISPs, process the ISP cost and performance information for each of the plurality of independent ISPs against the cost/performance profile, select the one independent ISP from among the plurality of independent ISPs based on the processing of the ISP cost and performance information against the cost/performance profile, receive updated ISP cost and performance information from at least one independent ISP after the selection, re-process the ISP cost and performance information against the cost/performance profile, and select a new independent ISP based on the re-processing; and
a storage system that stores the control software.

* * * * *